United States Patent
Rafii et al.

(10) Patent No.: US 9,898,902 B2
(45) Date of Patent: Feb. 20, 2018

(54) COMPUTER IMPLEMENTED METHOD FOR NOTIFYING USER BY USING A SPEAKER

(71) Applicant: Panasonic Intellectual Property Management Co., Ltd., Osaka (JP)

(72) Inventors: Zarina Rafii, Nara (JP); Yasuo Kohashi, Osaka (JP); Hiroko Sugimoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 89 days.

(21) Appl. No.: 15/074,925

(22) Filed: Mar. 18, 2016

(65) Prior Publication Data

US 2016/0307413 A1    Oct. 20, 2016

(30) Foreign Application Priority Data

Apr. 16, 2015  (JP) .................................. 2015-084028
Dec. 28, 2015  (JP) .................................. 2015-256786

(51) Int. Cl.
| | | |
|---|---|---|
| G08B 21/24 | (2006.01) | |
| G08B 3/10 | (2006.01) | |
| G08B 21/18 | (2006.01) | |
| F25D 23/00 | (2006.01) | |
| G06Q 30/02 | (2012.01) | |

(Continued)

(52) U.S. Cl.
CPC ............... *G08B 3/10* (2013.01); *G08B 21/18* (2013.01); *G08B 21/24* (2013.01); *G10L 15/26* (2013.01); *F25D 23/00* (2013.01); *G06F 1/3231* (2013.01); *G06F 13/00* (2013.01); *G06Q 30/02* (2013.01); *G06Q 30/06* (2013.01); *G06Q 50/00* (2013.01);
(Continued)

(58) Field of Classification Search
CPC ......... G08B 3/10; G08B 21/18; H04M 3/487; F25D 23/00; G06F 13/00; G06Q 30/02; G06Q 30/06; G06Q 50/00
See application file for complete search history.

(56) References Cited

U.S. PATENT DOCUMENTS 5,125,024 A * 6/1992 Gokcen .................. H04M 3/53
379/406.03
2009/0316671 A1* 12/2009 Rolf ........................ H04W 4/02
370/338
(Continued)

FOREIGN PATENT DOCUMENTS

| JP | 2007-132551 | 5/2007 |
|---|---|---|
| JP | 2007132551 A * | 5/2007 |
| JP | 2012-027679 | 2/2012 |

*Primary Examiner* — Benyam Haile
(74) *Attorney, Agent, or Firm* — Greenblum & Bernstein, P.L.C.

(57) ABSTRACT

A method including: receiving multiple pieces of notice information; receiving detection information indicating whether or not the user is present around a speaker, notifying the user of content of first notice information in the multiple pieces of notice information by using the speaker, in a case that it is determined based on the detection information that the user is present around the speaker, and notifying the user of content of second notice information different from the first notice information, by using the speaker in a case that it is determined that the user is present around the speaker when the notification of the first notice information by using the speaker is complete.

18 Claims, 14 Drawing Sheets

(51) Int. Cl.
    *G06F 1/32*     (2006.01)
    *G06Q 30/06*     (2012.01)
    *G06Q 50/00*     (2012.01)
    *G10L 15/26*     (2006.01)
    *G06F 13/00*     (2006.01)
    *H04M 3/42*     (2006.01)
    *H04M 3/487*     (2006.01)

(52) U.S. Cl.
    CPC ............ *G10L 15/265* (2013.01); *H04M 3/42* (2013.01); *H04M 3/487* (2013.01)

(56) References Cited

U.S. PATENT DOCUMENTS

2014/0229880 A1*   8/2014   Aradhye ............ G06F 17/3053
    715/771
2014/0347188 A1*   11/2014   Alameh ................ G08B 21/182
    340/686.6
2015/0256985 A1*   9/2015   Kornafeld ................ H04W 4/12
    455/466

\* cited by examiner

FIG. 7

| No. | METEOROLOGICAL ELEMENT | DATA | TEXT | PRIORITY | ANNOUNCE TIME |
|---|---|---|---|---|---|
| S001 | DISASTER PREVENTION INFORMATION | — | NO DISASTER PREVENTION INFORMATION | 1 | 3 SECONDS |
| S002 | WEATHER | CLEAR | TODAY WILL BE S002 | 2 | 2 SECONDS |
| S003 | MAXIMUM TEMPERATURE | 33°C | MAXIMUM TEMPERATURE IS S003 | 3 | 3 SECONDS |
| S004 | MINIMUM TEMPERATURE | 23°C | MINIMUM TEMPERATURE IS S004 | 3 | 3 SECONDS |
| S005 | PRECIPITATION PROBABILITY | 0% | PRECIPITATION PROBABILITY IS S005 | 4 | 4 SECONDS |
| S006 | ULTRAVIOLET RAYS | STRONG | LEVEL OF ULTRAVIOLET RAYS IS S006 | 5 | 3 SECONDS |

FIG. 9

```
PRIORITY ORDER INITIAL SETTING.txt
DISASTER PREVENTION INFORMATION > WEATHER > PRECIPITATION PROBABILITY >
MAXIMUM TEMPERATURE > MINIMUM TEMPERATURE > HUMIDITY > WIND VELOCITY >
AMOUNT OF RAINFALL > AMOUNT OF SNOWFALL > WEEKLY WEATHER > POLLEN > PM2.5
> ULTRAVIOLET RAYS>DRY SKIN>DUST > CHERRY BLOSSOM BLOOM FORECAST > FALL
FOLIAGE FORECAST > BEGINNING OF RAINY SEASON>END OF RAINY SEASON > LAUNDRY
INDEX > BEDDING AIRING INDEX > CAR WASHING INDEX > DRESS INDEX
```

FIG. 10

| No. | NOTIFICATION CONDITION | TARGET METEOROLOGICAL ELEMENT | PRIORITY |
|---|---|---|---|
| E001 | HEAVY RAIN/ FLOOD/TSUNAMI | AMOUNT OF RAINFALL | DISASTER PREVENTION INFORMATION + 1 |
| E002 | STORM/STRONG WIND/ TYPHOON | WIND VELOCITY | DISASTER PREVENTION INFORMATION + 1 |
| E003 | HEAVY SNOW | AMOUNT OF SNOWFALL | DISASTER PREVENTION INFORMATION + 1 |
| E004 | BLIZZARD | WIND VELOCITY | DISASTER PREVENTION INFORMATION + 1 |
| | | AMOUNT OF SNOWFALL | DISASTER PREVENTION INFORMATION + 1 |
| E005 | HIGH TEMPERATURE | MAXIMUM TEMPERATURE | DISASTER PREVENTION INFORMATION + 1 |
| ⋮ | ⋮ | ⋮ | ⋮ |

FIG. 11

| No. | NOTIFICATION CONDITION | TARGET METEOROLOGICAL ELEMENT | PRIORITY SETTING |
|---|---|---|---|
| C001 | PRECIPITATION PROBABILITY < 30% | PRECIPITATION PROBABILITY | – |
| C002 | (YESTERDAY'S WEATHER) == (TODAY'S WEATHER) | WEATHER | – |
| C003 | (TODAY'S MAXIMUM TEMPERATURE) – (YESTERDAY'S MAXIMUM TEMPERATURE) > 5°C | WEATHER | – |
| C004 | (YESTERDAY'S MAXIMUM TEMPERATURE) – (TODAY'S MAXIMUM TEMPERATURE) > 5°C | WEATHER | – |
| C005 | DISASTER PREVENTION INFORMATION == NONE | DISASTER PREVENTION INFORMATION | – |
| C006 | ULTRAVIOLET RAYS >= STRONG | ULTRAVIOLET RAYS | MAXIMUM TEMPERATURE + 1 |
| ... | ... | ... | ... |

FIG. 12

| METEOROLOGICAL ELEMENT | METEOROLOGICAL HISTORY INFORMATION | | | |
|---|---|---|---|---|
| | JULY 27 | PRIORITY ORDER | JULY 28 | PRIORITY ORDER |
| WEATHER | FINE | 1 | FINE | – |
| MAXIMUM TEMPERATURE | 32 | 2 | 37 | 2 |
| MINIMUM TEMPERATURE | 28 | 3 | 28 | 3 |
| ULTRAVIOLET RAYS | MEDIUM | 5 | STRONG | 4 |
| PRECIPITATION PROBABILITY | 10% | – | 0% | – |
| HUMIDITY | 68% | 4 | 60% | 5 |
| DISASTER PREVENTION INFORMATION | – | – | HIGH TEMPERATURE | 1 |

FIG. 13

| No. | NOTIFICATION CONDITION | TARGET METEOROLOGICAL ELEMENT | PRIORITY |
|---|---|---|---|
| H001 | TEMPERATURE > 30°C | MAXIMUM TEMPERATURE | 1 |
| H002 | TEMPERATURE < 10°C | MINIMUM TEMPERATURE | 1 |
| H003 | HUMIDITY < 40% | HUMIDITY | 1 |
| H004 | HUMIDITY > 60% | HUMIDITY | 1 |
| H005 | PM2.5 >= MEDIUM LEVEL | PM2.5 | 1 |
| H006 | POLLEN >= MEDIUM LEVEL | POLLEN | 1 |

| DATE | EVENT | LOCATION |
|---|---|---|
| JANUARY 25, 2014 | MEETING | KOBE |
| ⋮ | ⋮ | ⋮ |
| FEBRUARY 2, 2014 | BUSINESS TRIP | NAGOYA |
| ⋮ | ⋮ | ⋮ |
| FEBRUARY 10, 2014 | BUSINESS TRIP | TOKYO |
| ⋮ | ⋮ | ⋮ |
| APRIL 25, 2014 | TRAVEL | OKINAWA |
| ⋮ | ⋮ | ⋮ |

COMPUTER IMPLEMENTED METHOD FOR NOTIFYING USER BY USING A SPEAKER

BACKGROUND

1. Technical Field

The present disclosure relates to an information notification apparatus that performs notification of information by reading the information aloud, and more specifically, to a technique that controls an amount of information and the number of information pieces to be notified, adaptively depending on a state of a user.

2. Description of the Related Art

An information notification apparatus is under discussion and consideration that notifies, in a PUSH style, a user of information that the user needs in his/her daily life or information that he/she wishes, via a home appliance.

SUMMARY

However, the information notification apparatus described above requires further improvement.

In one general aspect, the techniques disclosed here feature an information notification method for solving the above problem in an information notification system that is connected to a speaker and notifies a user of voice information, the information notification method including receiving multiple pieces of notice information; receiving detection information indicating whether or not the user is present around the speaker; using the speaker to notify the user of content indicated by first notice information of the multiple pieces of notice information if it is determined based on the notice information that the user is present around the speaker and using the speaker to notify the user of content indicated by second notice information, which is different from the first notice information, if it is determined that the user is present around the speaker when notification of the first notice information by voice is complete.

Further improvements can be achieved with the aspect described above.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 illustrates a text conversion table stored in a text creation unit in the second embodiment;

FIG. 9 is a configuration file stored in an information control unit in the second example of the second embodiment;

FIG. 10 illustrates a condition table stored in the information control unit in the second example of the second embodiment;

FIG. 11 is a condition table stored in the information control unit in the second example of the second embodiment;

FIG. 12 illustrates a weather information table recorded in a weather history information database in the second example of the second embodiment;

FIG. 13 illustrates a condition table stored in an information control unit in a fifth example of the second embodiment;

Figure 1:
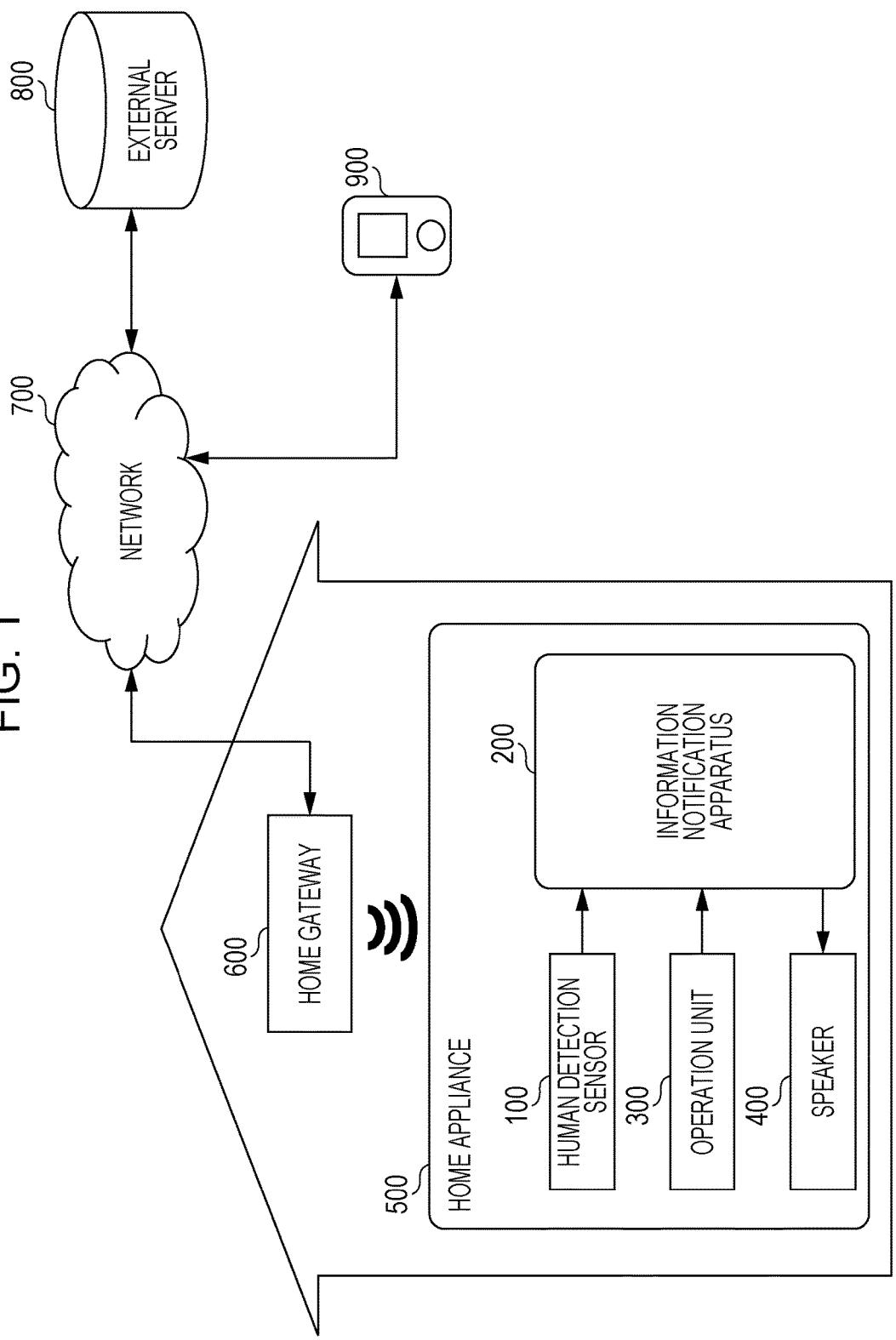
FIG. 1 illustrates an overall configuration of an information notification apparatus in a first embodiment.

DETAILED DESCRIPTION (Underlying Knowledge Forming Basis of the Present Disclosure)

Japanese Unexamined Patent Application Publication No. 2007-132551 discloses a technique related to an information notification system, for a refrigerator having a communication function with an external device, wherein when it is detected that a door of the refrigerator is opened or that an operation switch is pressed, information acquired from the external device is notified to a user by voice.

With the technique disclosed in Japanese Unexamined Patent Application Publication No. 2007-132551, short information can be conveyed from the refrigerator by voice, since it is assumed that the user is present around the refrigerator when the refrigerator door is opened or when the operation switch is pressed. However, since information is notified through the use of voice, it takes some time for notification of one piece of information to complete. When there are multiple pieces of information to notify, it takes very long till notification of those pieces of information is complete. Thus, even if the multiple pieces of information are notified in series, for example, the user may move to a different room while the information is being notified. Then, even though the user is not present on the spot, notification of all pieces of information scheduled to be notified to the user continues. In this case, it is assumed that the information notification system is configured not to notify again information that has been once notified, since many users do not wish to be notified of same information over and over. Then, the information notification system cannot determine whether or not the user listened to the notified information, and information notified while the user is not on the spot is treated as information that has already been notified. Then, when the user opens the refrigerator door again, the information notified while the user is not listening is not notified and different information is notified. Thus, the user cannot receive a notice on the information that is already notified while the user is not listening, even though the information is what the user wishes to listen. In addition, if the user starts to move from the spot while information is being notified in series and before next notification of information starts, the user may move beyond a range in which voice can reach the user while next information is being notified. Then, for example, it is possible that the user may listen to only a first part of the information and misidentify content, thus preventing the content of information from being conveyed accurately.

Hence, the following improvements are studied in order to enhance the capability of the information notification apparatus.

One aspect of the information notification method in the information notification system is an information notification method in an information notification system that is connected to a speaker and notifies a user of voice information. The information notification method includes: receiving multiple pieces of notice information; receiving detection information indicating whether or not the user is present around the speaker; notifying the user of content of first notice information in the multiple pieces of notice information by using the speaker, if it is determined based on the detection information that the user is present around the speaker; and notifying the user of content of second notice information different from the first notice information, by using the speaker if it is determined that the user is present around the speaker when the notification of the first notice information by voice is complete.

According to the above aspect, if it is determined that the user is present around the speaker, the first notice information is notified to the user and if it is determined when the notification of the first notice information is complete that the user is still present around the speaker, the second notice information is notified to the user. More specifically, it is decided whether or not notification of notice information is to be continued, by determining whether or not the user is present around the speaker when notification of an individual piece of notice information is complete. Thus, even when there are multiple pieces of information to notify, notification of information does not continue while the user is absent on the spot if the user moves from the spot during the notification. In addition, this can also prevent management of the information notified while the user is absent on the spot as information that is already notified. Furthermore, since notification of next information starts if the user is present around the speaker, the user is prevented from moving to a location where the information is not audible while it is being notified, unless notification of the information takes extremely long time to complete.

In the above aspect, for example, the information notification system may be further connected to a human detection sensor that detects whether or not the user is present, and the human detection sensor detects whether or not the user is present around the speaker. With this, it is determined by utilizing a human detection sensor whether or not a user is present around the speaker, an area of detecting user's presence can be adjusted by adjusting sensitivity of the human detection sensor.

In the above aspect, for example, it may be determined that the user is present around the speaker while the human detection sensor is detecting presence of the user. This allows notification of notice information to start while a user is reliably present in a speaker range.

In the above aspect, for example, if a state of the human detection sensor changes from a state in which presence of the user is detected to a state in which presence of the user is not detected, it may be determined within a predetermined period of time after the state of the human detection sensor changes that the user is present around the speaker. With this, if a detection range of a human detection sensor is smaller than an output range within which voice outputted by a speaker is audible, the notice information can be notified to the user without missing an opportunity to do so when the user is present in the output range though he/she is out of the detection range of the human detection sensor.

In the above aspect, for example, the information notification system may be further connected to a refrigerator provided with the speaker, the refrigerator may have a door and an open/close sensor that detects an open/close state of the door, and the detection information may be information indicating the open/closed state detected by the open/close sensor. Since it is determined that the user is present around the speaker when the door of the refrigerator provided with the speaker is in a physically opened state, there is no need to newly add a component to detect presence of a user, which is achieved by using the open/closed sensor of the door the refrigerator is provided with.

In the above aspect, for example, it may be determined while the open/close state is an open state that the user is present around the speaker. Notification of notice information can start when the user is reliably present around the speaker.

In the above aspect, for example, if the open/closed sensor detects that the open/closed state changes from the open state to a close state, it may be determined within a predetermined period of time after a time point when the open/closed state changes that the user is present around the speaker. Even in the condition in which the user closes the door of the refrigerator and is about to leave the spot, notice information can be notified to the user without missing an opportunity to do so if the user is present in the output range where voice outputted from the speaker is audible.

In the above aspect, for example, the first notice information and the second notice information may include text information, and using notice voice synthesized based on the text information, content indicated by the first notice information and the second notice information may be notified to the user. Since multiple pieces of notice information can be received in a text format, the capacity of a memory in which the received multiple pieces of notice information is stored can be reduced.

In the above aspect, for example, the multiple pieces of notice information may be voice information, and the first notice information and the second notice information may be notified to the user by playing the voice information. Since the multiple pieces of notice information are received in the form of voice information, the system is not required to have a configuration to synthesize voice, which can thus construct the system to be simple.

In the above aspect, for example, each of the multiple pieces of notice information may be assigned a priority, and the first notice information may be selected from the multiple pieces of notice information based on the priority. Since the priority is used, for example, important information can be preferentially notified to the user.

In the above aspect, for example, the priorities of types of the notice information are set to any priorities desired by a user. Since a user who receives a notice sets the priority, appropriate information that the user wishes to be notified of can be preferentially notified.

In the above aspect, for example, the priorities of types of the notice information may be set in advance, and based on weather information or meteorological information at a time on a day when the notice information is to be notified, the priorities of the types of the notice information may be changed, if content indicated by the weather information or content indicated by the meteorological information matches a predetermined condition. For example, it is assumed that even if a user usually sets so that information indicating temperatures is preferentially notified, the user may wish to preferentially know information on a disaster that may endanger the user in a case in which it is likely that a disaster may occur due to the weather or meteorological condition on that day. In the above aspect, information to notify can be preferentially changed to deal with a case in which important information is updated on a daily basis, depending on the weather or meteorological condition.

In the above aspect, for example, the first notice information may be notice information having the highest priority among the multiple pieces of notice information. Since the information with the highest priority is notified first among the multiple pieces of notice information, a user can be prevented from moving from the location around the speaker before being notified of the important information.

In the above aspect, for example, the second notice information may be notice information having the second highest priority next to the first notice information among the multiple pieces of notice information. Since information with high priority is notified in order among multiple pieces of notice information, a user can be prevented from moving from the location around the speaker before being notified of the important information.

In the above aspect, the speaker may be installed inside a house, and the information notification system may be further connected to an information terminal and an absence detection device. The method may include: determining whether or not there is unnotified information, which is notice information that is not notified to the user among the multiple pieces of notice information, if it is determined that the user is not present around the speaker after the first notice information is notified to the user receiving absence detection information from the absence detection device, the absence detection information indicating that the user goes out of the house where the speaker is installed; and notifying the user of the unnotified information via the information terminal, if it is determined that the unnotified information is present and if the absence detection information is received. If the speaker is equipped inside the house and when the user goes out, the unnotified information of the multiple pieces of notice information cannot be notified to the user since the user is not present around the speaker for some time. According to the above aspect, since the unnotified information is transmitted to the information terminal if the user is out, the user can be prevented from going out without being notified of information that should be notified.

In the above aspect, if there are multiple pieces of unnotified information, at least one of the multiple pieces of unnotified information may be notified to the user via the information terminal. When there is a high volume of unnotified information, and if all of them is transmitted to the information terminal, the user will be confused as he/she does not know what information is important. The above aspect can prevent such a condition.

In the above aspect, the information notification method may include: receiving daily destination information indicating a destination to be visited by the user; and receiving, as the multiple pieces of notice information based on the destination information, weather information or meteorological information at the destination to be visited by the user on a date when the notice information is to be notified. For example, if the user goes far, the user wishes to acquire information on a destination region other, than his/her resident location. With the above aspect, such a request can be met.

In the above aspect, the information notification system may be further connected to a microphone. The method may include: receiving speech information representing speech of the user from the microphone; and during notification of any notice information of the multiple pieces of notice information, suspending the notification of the notice information being notified if the system receives the speech information. This can prevent interruption of conversation if the user starts the conversation with someone while the information is being notified.

In the above aspect, the information notification system may be further connected to a microphone. The method may include: receiving speech information representing speech of the user from the microphone; and keeping the user from being notified of content indicated by the second notice information if it is determined based on the received speech information that the user is present and speaking around the speaker when notification of the first notice information is complete. This can prevent interruption of conversation by notification of new information that starts while the user is in conversation.

In addition, another aspect provides an information notification apparatus comprising: a processor; a speaker; and a memory having thereon a program, the program causing the processor to execute operations including: receiving one or more pieces of notice information to be notified to a user; acquiring detection information indicating whether or not the user is present around the speaker; notifying the user of first notice information of the one or more pieces of notice information if it is determined based on the detection information that the user is present around the speaker; and notifying the user of second notice information, which is different from the first notice information, if it is determined when the notification of the first notice information is complete that the user is present around the speaker. According to the above aspect, if it is determined that a user is present around the speaker, first notice information is notified to the user, and if it is determined when notification of the first notice information is complete that the user is still present around the speaker, second notice information is notified to the user. More specifically, it is decided whether or not notification of notice information is to be continued, by determining whether or not the user is present around the speaker when notification of an individual piece of notice information is complete. Thus, even when there are multiple pieces of information to notify, notification of information does not continue while the user is absent on the spot if the user moves from the spot during the notification. In addition, this can also prevent management of information notified while the user is absent on the spot as information that is already notified. Furthermore, since notification of next information starts if the user is present around the speaker, the user is prevented from moving to a location where the information is not audible while it is being notified, unless notification of the information takes extremely long time to complete.

For information notification by voice, it is important to adjust not only timing to communicate but also an amount of information to notify, for example, time of announcing information to be notified to a user or number of information pieces to be included in one notice. Even at preferable timing, if notification of very long information continues, depending on a situation, it may not be possible for the user to stop on the spot and listen to the end.

In addition, if there are a large number of information pieces scheduled to be notified to a user on that day, it is considered that all of the scheduled information may not be notified since, for example, such a condition as the number of times that the user approaches a home appliance does not necessarily satisfy the number of information desirable to be notified. Thus, what information is preferentially notified to a user needs to be decided according to the priority.

In the related art references listed above, the request described above cannot be met since they do not go beyond notification of information that is needed by a user at appropriate timing based on a situation of the user.

Additionally, the problem described above is not limited to multiple pieces of information having different properties, and it is possible that the problem may also occur even when information having various elements, such as meteorological information, is notified.

For example, if a user wishes to be notified every day of meteorological information including three meteorological elements such as "today's weather", "maximum temperature", and "precipitation probability", an information provider provides information "It will be clear today, maximum temperature will be 29 degrees, and precipitation probability will be 20%" in response to the user's preferences.

It can be stated, however, that even if the above meteorological information was changed to a sentence having a smaller number of information pieces and shorter time of announcement, such as "It will be clear today and maximum temperature will be 29 degrees" or "Today's maximum temperature will be 29 degrees and precipitation probability will be 20%", content of information to be notified to the user would not make such a big difference. More specifically, in such a case, information of being "clear" has a similar value to information of "precipitation probability being 20%" and it is assumed that either of them can be omitted.

From such a standpoint, failure of notification can be prevented by reducing the amount of information depending on a situation of a user at that time. Furthermore, if a notification method capable of adaptively controlling the order of information to notify can be provided, effective information notification to users can be performed.

Hence, a system of automatically creating a text on meteorological information for which an upper limit of announcement is defined in advance is proposed (see Japanese Unexamined Patent Application Publication No. 2012-27679). However, the technique described in Japanese Unexamined Patent Application Publication No. 2012-27679 is a system provided for a weather forecasting program to be broadcasted on a television or radio, for example, wherein content of information and amount of information to be notified to suit individual user's convenience are not adjusted although content of information is changed depending on status of weather. More specifically, this conventional technology is a system for controlling a text on national weather status to be announced in a program in accordance with program broadcasting time that is predetermined in advance, and not a system for adjusting the amount of information such as content of information or time duration of announcement, depending on status or a request of an individual user. The conventional system described above cannot be utilized to such an end.

Then, a technique to provide information that a user needs in his/her daily life through a home appliance having a function of communication with an external device is under discussion and consideration. However, while a user finds it convenient to save the effort of manipulating a terminal by himself/herself to check out necessary information or setting a reminder to manage information, he/she feels uncomfortable being excessively notified of information. A technical solution for this problem has not been studied.

An information notification apparatus and an information notification method in one aspect of the disclosure can adaptively control the amount of information and the number of information pieces of information to be announced by voice, depending on a situation of a user at that time, and notify information in the descending order of priority.

Any of embodiments to be described hereinafter illustrates one specific example of the present disclosure. A numeric value, shape, a component, a step, order of steps or the like which are shown in the following embodiments are examples and not intended to limit the disclosure. In addition, of components in the following embodiments, any component which is not described in an independent claim showing the top-level concept is described as any appropriate component. In addition, in all embodiments, content of each embodiment can also be combined.

First Embodiment

Note that in embodiments to be described below, although an example in which a notification function that an information notification apparatus of the disclosure has is applied to a home appliance in a house is described as an example, a device to which the function is applied is not limited to a home appliance in the house and may be any device. In addition, in a description of a first embodiment, although information to be notified is meteorological information, information to be notified is not limited to the meteorological information and may be any information such as traffic information, information on a garbage collection day, fortune-telling, or the like.

First, an overview of an information notification system is described below.

[Overview of an Information Notification System in the First Embodiment]

FIG. 1 is a diagram illustrating an overall configuration of an information notification system.

As illustrated in FIG. 1, the information notification system includes a home appliance 500, a home gateway 600, a network 700, an external server 800, and an information terminal 900. Here, in addition to a configuration (not shown) to perform functions incorporated for its intended purpose, the home appliance 500 includes an information notification apparatus 200, a human detection sensor 100, an operation unit 300, and a speaker 400. The home appliance 500 also has a function to communicate with the external server 800 and the information terminal 900 from the home gateway 600 via the network 700. Then, communications may be performed through the use of a wired or wireless communication protocol or by using both. A type of the home appliance 500 is assumed to include an AV device or residential equipment or the like, as well as a general home appliance such as a refrigerator, a washing machine, a microwave oven, for example, and not limited, in particular.

The human detection sensor 100 uses infrared rays or ultrasonic waves and can automatically detect that a user approaches the human detection sensor 100 or whether or not the user is present in a predetermined area.

The operation unit 300 can detect that a user operates a home appliance, such as a button mounted on the home appliance 500 or an open/closed sensor of a door or a lid.

The speaker 400 is utilized to perform notification by voice information generated by the information notification apparatus 200.

The information terminal 900 is a portable terminal, such as a smart phone or a tablet, and utilized to acquire an application dedicated to use of a function of the information notification system or acquire setting information inputted by a user on a web browser related to the information notification system. In addition, as described below, it is also used to receive information that cannot be notified to a user.

The home gateway 600 converts a communication method (protocol) between a communication method supported by the network 700 and that supported by the home appliance 500. Note that a wired LAN, for example can be used as a method supported by the home appliance 500 in the case of wired communications. In addition, in the wireless communication method, for example, a wireless LAN, Wi-Fi, Bluetooth®, Zigbee® or the like can be adopted.

The external server 800 is, for example, a server for providing latest meteorological information such as a server of the Japan Weather Association, and is utilized when the information notification apparatus 200 acquires meteorological information to be notified to the user. Meteorological information received from the external server 800 is meteorological information including "Weather information" such as "clear", "rainy", or meteorological information including various meteorological elements such as "temperature", "humidity", "precipitation probability", "wind velocity", or the like.

In the above example, although the information notification apparatus 200 is included in the home appliance 500, the information notification apparatus 200 may be an independent apparatus. In addition, the human detection sensor 100 and the speaker 400 may be included in the information notification apparatus 200. Alternatively, the home appliance 500, the information notification apparatus 200, the speaker 400, and the human detection sensor 100 may be configured as an independent apparatus each having the communication function. In this case, each apparatus exchanges information with each other through the home gateway 600.

[Internal Configuration of the Information Notification System in the First Embodiment]

Figure 2:
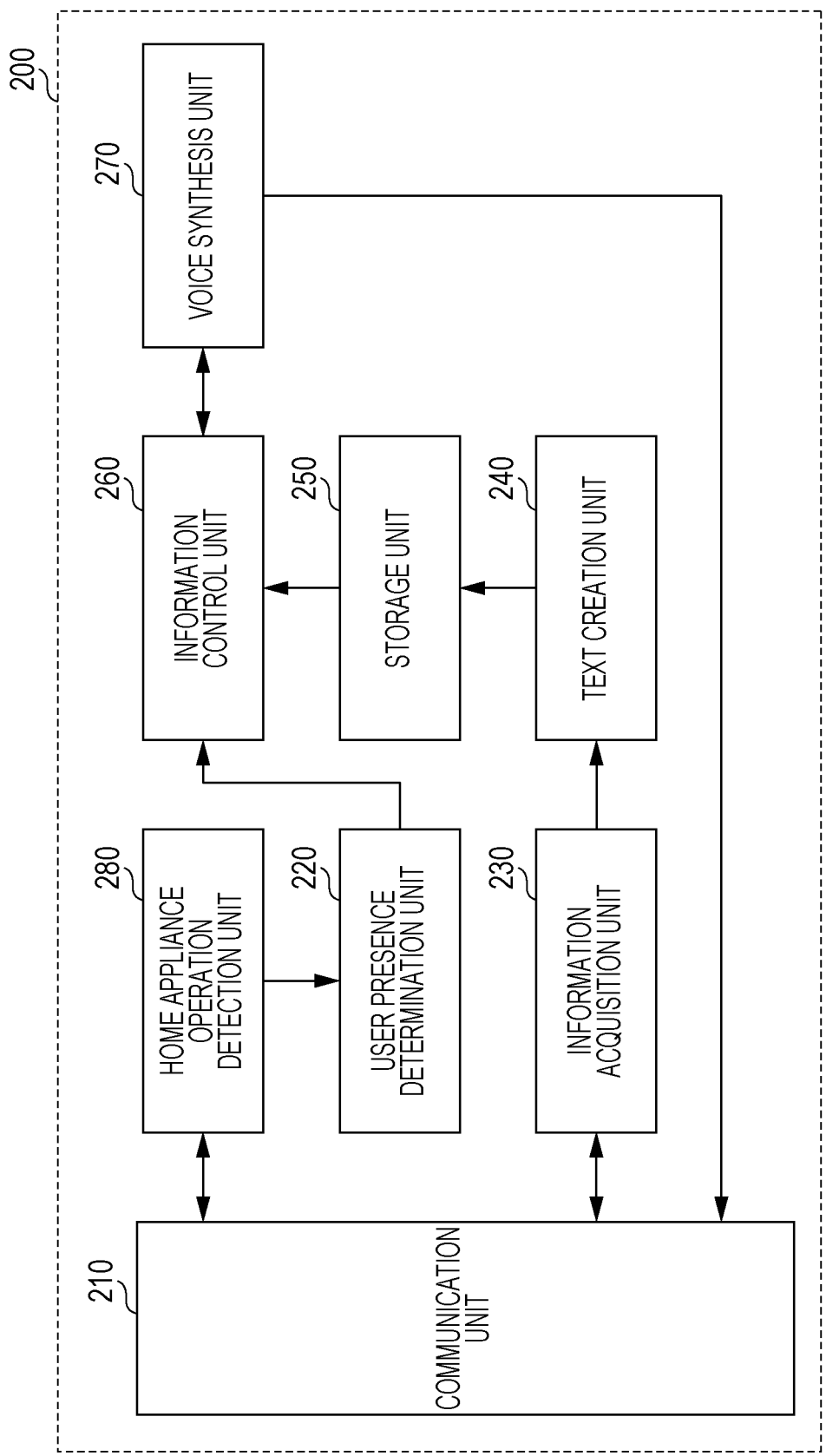
FIG. 2 is a block diagram illustrating an internal configuration of an information notification apparatus in a first example and a second example of the first embodiment.

FIG. 2 is a block diagram illustrating an internal configuration of the information notification apparatus in this embodiment.

The information notification apparatus 200 includes a communication unit 210, a user presence determination unit 220, an information acquisition unit 230, a text creation unit 240, a storage unit 250, an information control unit 260, a voice synthesis unit 270, a home appliance operation detection unit 280.

The communication unit 210 is a communication interface for managing input and output of information of the information notification apparatus 200. The communication unit 210 can receive information indicating whether or not a user is present who has been detected by the human detection sensor 100 or the operation unit 300 or information stored in the external server 800, transmit to the speaker 400 voice information generated by the information notification apparatus 200, or the like.

The home appliance operation detection unit 280 accesses the human detection sensor 100 or the operation unit 300 to acquire information indicating whether or not a user is present and transmits it to the user presence determination unit 220.

The user presence determination unit 220 determines whether or not the user is present, based on the information obtained from the home appliance operation detection unit 280. The user presence determination unit 220 also requests the information control unit 260 to perform notification of the information if it determines that the user is present.

The information acquisition unit 230 is utilized to acquire latest meteorological information stored in the external server 800 via the communication unit 210, or personal information or setting information inputted by the user on the information terminal 900. Here, the information acquired by the information acquisition unit 230 is identified as any form of voice data, numeric data, or text data. Note that the meteorological information that the information acquisition unit 230 acquires from the external server 800 is in the form of numeric data, it is necessary that the text creation unit 240, to be described below, is included in the information notification unit 200. On the other hand, if the meteorological information acquired from the external server 800 is voice data or text data, it is not necessary that the text creation unit 240 is included in the information notification apparatus 200.

The storage unit 250 is a memory to temporarily store multiple pieces of meteorological information acquired by the information acquisition unit 230 from the external server 800.

If the user presence determination unit 220 determines that the user is present, the information control unit 260 extracts first notice information to be notified to the user from multiple pieces of information stored in the storage unit 250 and transmits it to the voice synthesis unit 270.

The voice synthesis unit 270 performs a voice conversion process based on the information acquired by the information acquisition unit 230 and notifies the user by using the speaker 400.

If meteorological information acquired by the information acquisition unit 230 is in the form of numeric data, the text creation unit 240 creates text data by using a text conversion table (to be described below) that has been defined in advance based on the acquired meteorological information.

One example of the specific internal configuration of the information notification apparatus 200 has been described above.

The overview of the information notification apparatus 200 has been described above.

[Specific Example of the Information Notification Apparatus in the First Embodiment]

A method of determining whether or not a user is present in the information notification system of this embodiment is described hereinafter with three examples of first to third example in a specific manner. Note that the description here corresponds to a case in which there is one user and meteorological information to be notified to the user is meteorological information on an area where the information notification apparatus 200 is installed.

First Example

First of all, a first example corresponds to the following situation.

An operation unit 300 is an open/closed sensor, and a home appliance 500 is, for example, a refrigerator with a door having an opening/closing sensor. Here, an information notification apparatus 200 detects by the operation unit 300 whether or not the door of the refrigerator is open, and determines based on this whether or not a user is present. More specifically, while the information notification apparatus 200 detects that the door of the refrigerator is open, it determines that the user is present around the refrigerator. In addition, when the information notification apparatus 200 detects that the door of the refrigerator is open, it may determine that the user is present around the refrigerator during a predetermined period of time after the time when the door is closed thereafter.

For example, suppose that the user opens the door of the refrigerator to take out a drink or food material for cooking in the refrigerator. In response, the operation unit 300 causes an interrupt to the information notification apparatus 200. The home appliance operation detection unit 280 accesses the operation unit 300 to acquire information and transmits it to the user presence determination unit 220. Then, the operation unit 300 may transmit to the home appliance operation detection unit 280 information indicating that the door is opened. The user presence determination unit 220 determines whether the user is present based on the information acquired from the home appliance operation detection unit 280. If the user presence determination unit 220 determines that the user is present, it requests the information control unit 260 to perform notification of meteorological information. In response, the information control unit 260 extracts meteorological information stored in the storage unit 250 and transmits it to the voice synthesis unit 270. The voice synthesis unit 270 performs a voice conversion process on the received meteorological information and uses the speaker 400 to notify the user of the meteorological information. Here, meteorological information stored in the storage unit 250 is the latest meteorological information acquired by the information acquisition unit 230 from the external server 800. In addition, if meteorological information acquired from the external server 800 is in the form of numeric data, the text creation unit 240 refers to a text conversion table (to be described below) that has been defined in advance and creates text data of meteorological information. Based on the created text data, the meteorological information is subjected to the voice conversion process in the voice synthesis unit 270. According to the above example, information is naturally provided during an action done by a user in his/her daily life. In addition, since information is provided automatically, a user does not have to actively access information using an information terminal or the like to acquire information. Since no special operation is needed to acquire information, an information notification system that is highly convenient to users can be provided.

In the above example, while the operation unit 300 is described taking an example of the open/closed sensor mounted in the home appliance 500, an operation button or a touch panel or the like can be utilized instead of the operation function incorporated in the home appliance 500.

Second Example

Hereinafter, a second example describes with reference to FIG. 3 an example of a method of determining whether or not a user is present in a case in which an information notification system includes a home appliance 501 that is installed in the same space as a home appliance 500 and connected in the same networking environment as that of the home appliance 500.

Figure 3:
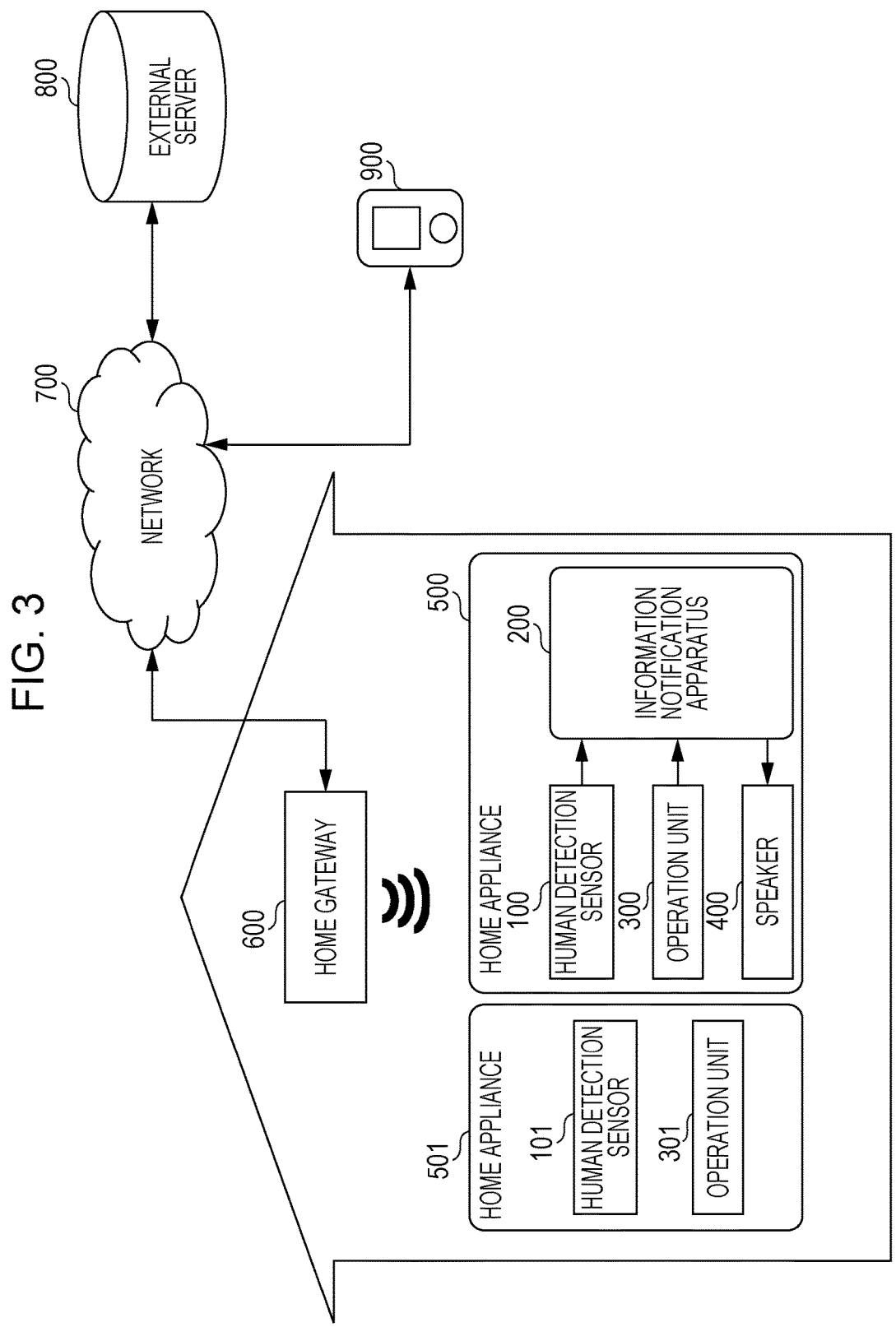
FIG. 3 illustrates an overall configuration of the information notification apparatus in the second example of the first embodiment.

FIG. 3 further includes the home appliance 501, in addition to the configuration of the information notification system of FIG. 1 described in the first example. The home appliance 501 has a communication function, not shown, with a home gateway 600, and includes a human detection sensor 101 and an operation unit 301.

In the second example, it is assumed that the home appliance 500 is installed in a kitchen, and the home appliance 501 having the communication function is present in the same space. The home appliance 501 is a microwave oven, a dishwashing machine, a rice cooker, an IH cooking heater or the like, for example. It is assumed that the home appliance 500 can exchange information with the home appliance 501 via the home gateway 600 and that a distance between the home appliance 500 and other home appliance 501 is in a predetermined range in which voice of a speaker 400 is audible.

In addition, here, suppose that the operation unit 300 and the operation unit 301 are operations buttons which are mounted in the home appliance 500 and the home appliance 501, respectively. The information notification apparatus 200 detects by the operation unit 300 or the operation unit 301 whether or not the operation button is operated, and determines based on this whether or not a user is present. More specifically, while the information notification apparatus 200 detects that the operation button is operated, it determines that the user is present around the home appliance 500 or the home appliance 501. In addition, if it is detected that the operation button is operated, the information notification apparatus 200 may determine that the user is present around the home appliance 500 or the home appliance 501 within a predetermined period of time after the time point when the operation button enters an inactive state. For example, suppose that the user operates the operation button of the home appliance 501 to do cooking in the kitchen. In response, the operation unit 301 causes an interrupt to the information notification apparatus 200 via the home gateway 600. When interrupted, the information notification apparatus 200 notifies the user of meteorological information. Since operation within the information notification apparatus 200 is similar to the first example, a description thereof is omitted here.

According to the above example, it is assumed that a chance to notify information increases if it can be detected that the user stays in a kitchen or the like for a long time to do cooking or the like. This can reduce failure of information notification even when notification of a large number of information pieces is scheduled.

Third Example

Figure 4:
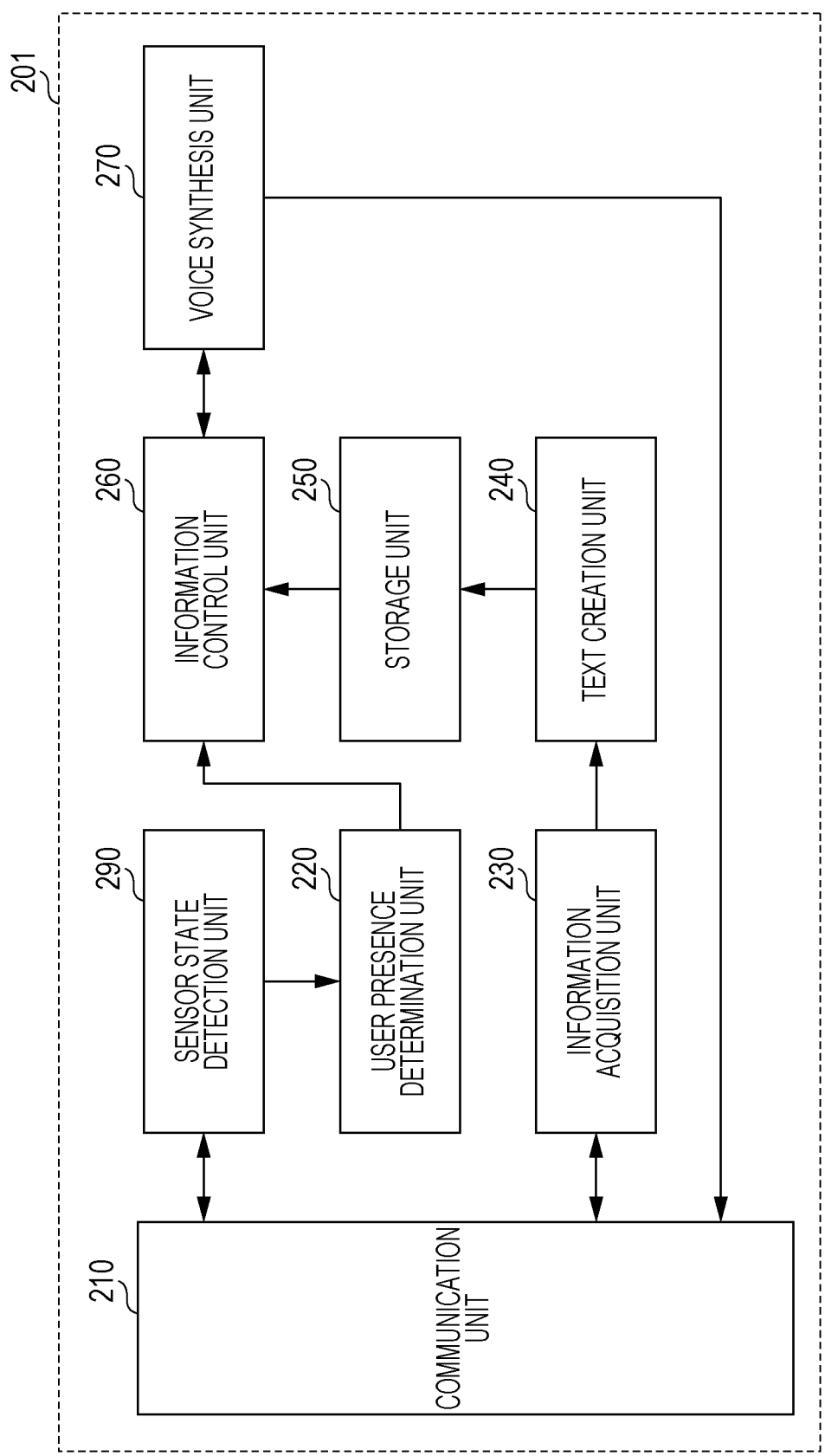
FIG. 4 is a block diagram illustrating an internal configuration of an information notification apparatus in a third example of the first embodiment.

Hereinafter, a third example describes with reference to FIG. 4 an example of a method of determining whether or not a user is present by using a human detection sensor 100 that a home appliance 500 is provided with. FIG. 4 is a block diagram illustrating an internal configuration of the information notification apparatus in the third example of the first example. Compared with the information notification apparatus 200 illustrated in FIG. 2, an information notification apparatus 201 includes a user state detection unit 290, in place of the home appliance operation detection unit 280. The user state detection unit 290 receives from the human detection sensor 100 information indicating whether or not a user is present and transmits the information to a user presence determination unit 220. The user presence determination unit 220 determines based on the information received from the user state detection unit 290 whether or not a user is present around the home appliance 500. More specifically, in the third example, through the use of the human detection sensor 100, the information notification apparatus 201 determines whether or not the user is present. In addition, if the human detection sensor 100 detects presence of the user, the information notification apparatus 201 may determine within a predetermined period of time after the time point when the human detection sensor 100 no longer detects the presence of the user that the user is present around the home appliance 500. This assumes a case in which the use is still present around the home appliance 500 although the user is out of a range within which the human detection sensor can detect the user.

Now, a specific example in the third example is described. Suppose that the human detection sensor 100 detects that the user is approaching the home appliance 500. In response, the human detection sensor 100 causes an interrupt to the information notification apparatus 201. Within the information notification apparatus 201, the sensor state detection unit 290 accesses the human detection sensor 100 to acquire information and transmits it to the user presence determination unit 220. Then, the human detection sensor 100 may transmit to the sensor state detection unit 290 information indicating that presence of the user is detected. The user presence determination unit 220 determines based on the information obtained from the sensor state detection unit 290 whether or not the user is present. If the user presence determination unit 220 determines that the user is present, it requests the information control unit 260 to perform notification of meteorological information. In response, the information control unit 260 reads out meteorological information stored in a storage unit 250 and transmits it to a voice synthesis unit 270. The voice synthesis unit 270 performs a voice conversion process of the received meteorological information and uses a speaker 400 to notify the user of the meteorological information. Here, since a method of acquiring meteorological information stored in the storage unit 250 is similar to the description of the first example, a description thereof is omitted.

According to the above example, not only can the same effects as those of the second example be achieved, but also there is no longer a need to detect operation of multiple home appliances. Thus, without having a complicated configuration, it can be detected whether or not a user is present.

The method of determining whether or not a user is present in the first embodiment is described above using the first to third examples of the first embodiment. Any of these may be used in first to fifth embodiments as described below.

In the second example, the example of detecting presence of the user by using the operation function incorporated in the home appliance 500 or the home appliance 501 is described. However, for example, if an information terminal 900 carried by a user is connected in the same networking environment as that of the home appliance 500 and if the information notification apparatus 200 can acquire positional information in a user's house, the information terminal 900 can be utilized in place of the operation unit 300. In addition, the operation unit 300 may be any operation function, such as an open/closed sensor or a touch panel mounted in the home appliance 500 or the home appliance 501, as long as it can detect that a home appliance has been operated.

Figure 5:
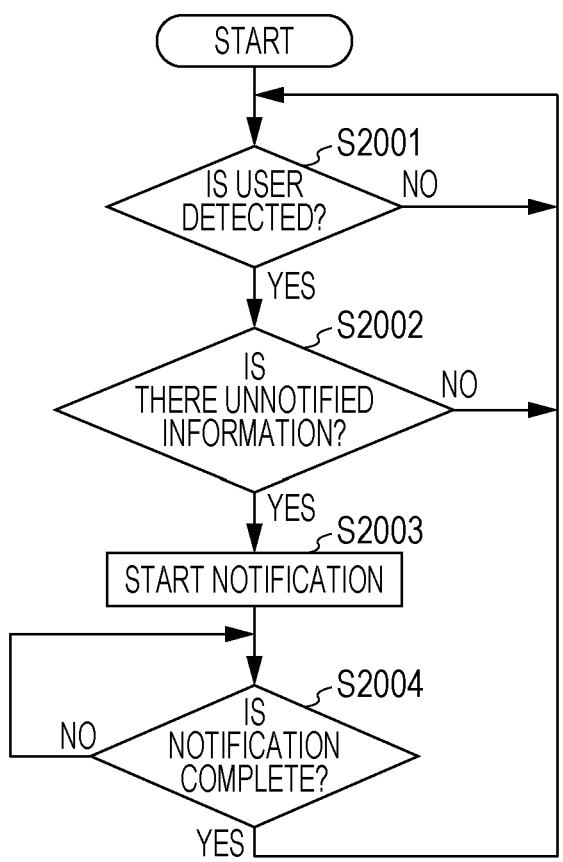
FIG. 5 is a flowchart illustrating a procedure of the information notification apparatus in the first embodiment.

With reference to FIG. 5, an information notification procedure of the information notification apparatus 200 or 201 (hereinafter described as the information notification apparatus 200) in this embodiment is described.

[Procedure of the Information Notification Apparatus]

FIG. 5 is a flowchart illustrating a procedure of the information notification apparatus in the first embodiment. Here, a description is given on the assumption that the information notification apparatus 200 acquires in advance multiple pieces of notice information to be notified to a user from an external server 800 or the like via a network 700, stores it in a storage unit 250 of the information notification apparatus 200, reads out the notice information stored in the storage unit 250, and notifies the user of the information. However, a form of acquisition of notice information is not limited to the above, and every time a need arises to newly perform notification of information, information may be acquired from the external server 800 via the network 700 and the acquired information may be notified.

In FIG. 5, in step S2001, if it is determined by using the methods described in the first to third examples that the user is present around the home appliance 500, the user presence determination unit 220 requests the information control unit 260 to perform notification of meteorological information. In response, in step S2002, the information control unit 260 determines whether or not there is any unnotified meteorological information in information stored in the storage unit 250. If the information control unit 260 determines that there is unnotified information, in step S2003, it starts to perform notification of first meteorological information. Then, in step S2004, the information control unit 260 determines whether or not notification of the first meteorological information is complete. If the notification is complete, the information control unit 260 returns to step S2001 and detects presence of a user again. Now, if the information control unit 260 determines through step S2001 and step S2002 that the user is present and that there is unnotified information, it starts to perform notification of second meteorological information in step S2003. On the other hand, if it determines when notification of the first notice information is complete that the user is not present around the home appliance 500 or that there is no unnotified information, the information control unit 260 does not perform notification of the second information.

With the above procedure, the information notification apparatus 200 can accurately perform notification of information by adaptively controlling the number of information pieces to be notified to a user. In addition, even when there are a large number of information pieces scheduled to be notified to a user, the multiple pieces of information can be collectively notified, and information can be notified to the user without missing a chance of notification.

In addition, in the form in which if there arises a need to newly perform notification of information, information is acquired every time from the external server 800 via the network 700 and the acquired information is notified, the external server may manage whether or not information has been notified or the storage unit 250 may manage information indicating whether or not the information has been notified.

In this embodiment, while the example is described in which the human detection sensor 100 and the operation unit 300 are mounted in the home appliance 500, a configuration may be such that each of them is an independent device.

The first embodiment has been described above.

Second Embodiment

In the first embodiment described above, the method of sensor-controlling the number of information pieces of meteorological information to be notified by the human detection sensor 100 or the operation unit 300 mounted in the home appliance 500 is described. However, no consideration is given to the order of outputting notice information if there are a large number of pieces of information to be notified to a user. For example, if the number of times when a user is present around the home appliance 500 is small or a period of time during which the user is present is short, it is necessary to preferentially notify information that is important to the user. Thus, in this embodiment, a method of setting a priority order of information to notify if it is determined that a user is present around the home appliance 500 is specifically described using a first to six examples.

First Example

Figure 6:
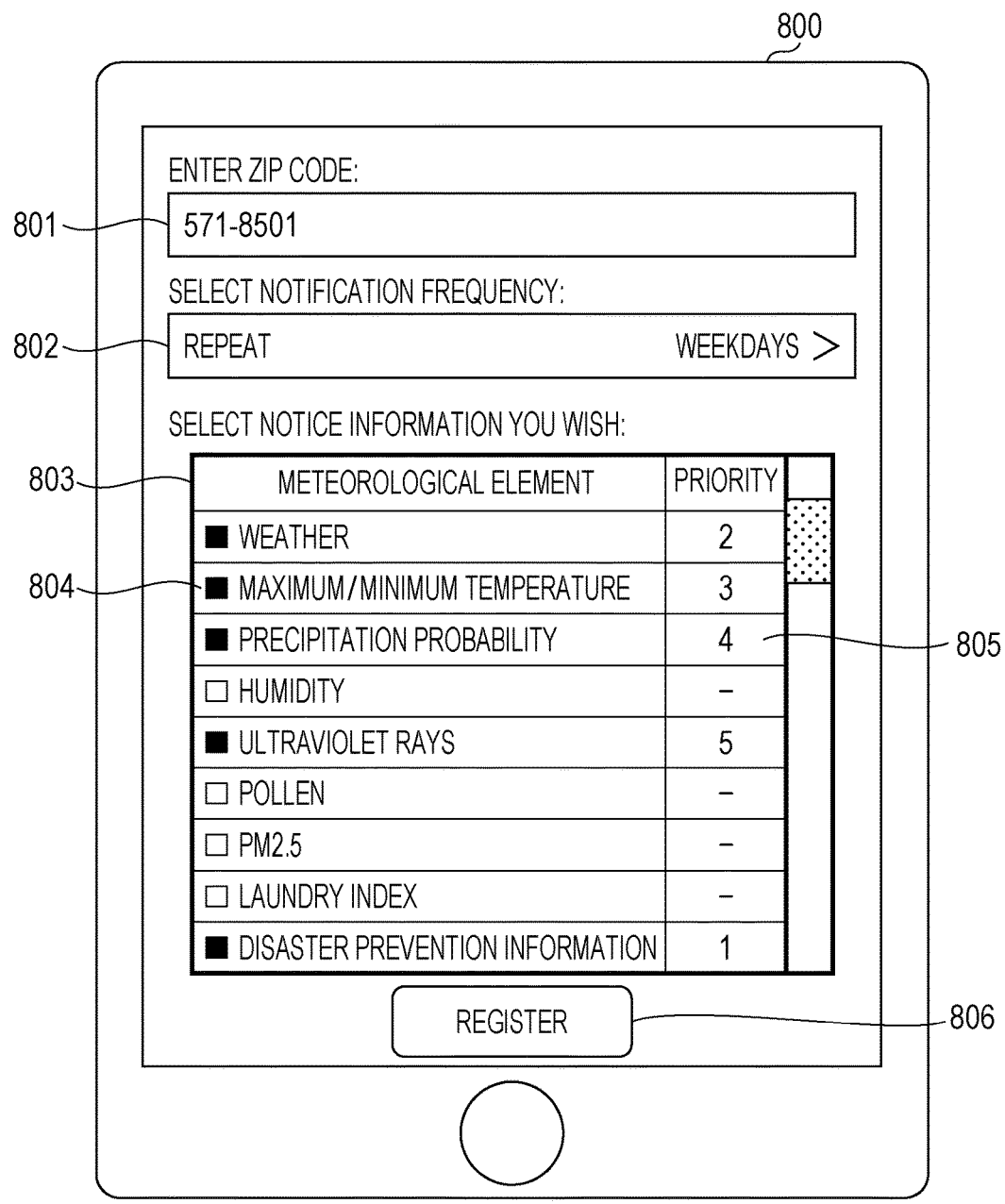
FIG. 6 illustrates a setting screen displayed in an information terminal in a first example of a second embodiment.

First of all, in a first example is described as an example in which a user may use an information terminal 900 to optionally set content and a priority order of meteorological information to be notified to the user. FIG. 6 is a diagram of the information terminal 900 illustrating a setting screen displayed in a dedicated application to use a function of the information notification apparatus 200 or a web browser related to an information notification system.

On the setting screen illustrated in FIG. 6, specifically, a user inputs information on his/her current resident location in the form of a zip code, in a text field 901, for example, selects notification frequency of the desired meteorological information on that day from a list in a select field 902, and checks off a corresponding item from a list 903, which classifies content of desired meteorological information by a meteorological element, in a checkbox 904. After the user selects from a select field 905 a priority order by which each of the selected meteorological elements is notified and clicks Register button 906, all of the setting information inputted by the user is transmitted from the information terminal 900 to the information notification apparatus 200 via a network 700.

In the information notification apparatus 200, the information acquisition unit 230 receives the setting information inputted by the user via a communication unit 210 and acquires corresponding meteorological information from an external server 800, depending on the received setting information. If the meteorological information acquired from the external server 800 is in the form of numeric data, a text creation unit 240 creates text data depending on the acquired numeric data.

FIG. 7 illustrates one example of a text conversion table that associates with the user's setting information a sentence structure of text data generated depending on a type of meteorological information that the text creation unit 240 acquired from the external server 800. In FIG. 7 are included a number assigned to manage meteorological information, information on a desired meteorological element that a user has set, numeric data of meteorological information acquired from the external server 800, a structure of text data to be generated depending on a type of meteorological information, and a priority order set by the user.

Here, within the information notification apparatus 200, the text creation unit 240 in FIG. 4 stores in a storage unit 250 the text conversion table illustrated in FIG. 7. Then, when receiving a notification request from a user presence determination unit 220, an information control unit 260 extracts first notice information from the storage unit 250 according to the priority order set by the user.

In this manner, according to the first example described above, information that a user desires can be notified in the descending order of priority and failure of notification of information that is important to the user can be prevented.

Second Example

In the first example, the method of causing a user to set information to be notified to the user and a priority order of the information is described. However, this method places considerable burdens on the user as the number of information pieces increases. In addition, the user will need to change settings every season as content of meteorological information widely varies depending on each season. Thus, a method in which setting of a priority order is flexibly changed depending on content of meteorological information on that day is preferable. Then, in a second example is described an example of automatically setting a priority order of information to notify, depending on a condition prepared in advance by an information provider, without requesting a user to set the priority order.

Figure 8:
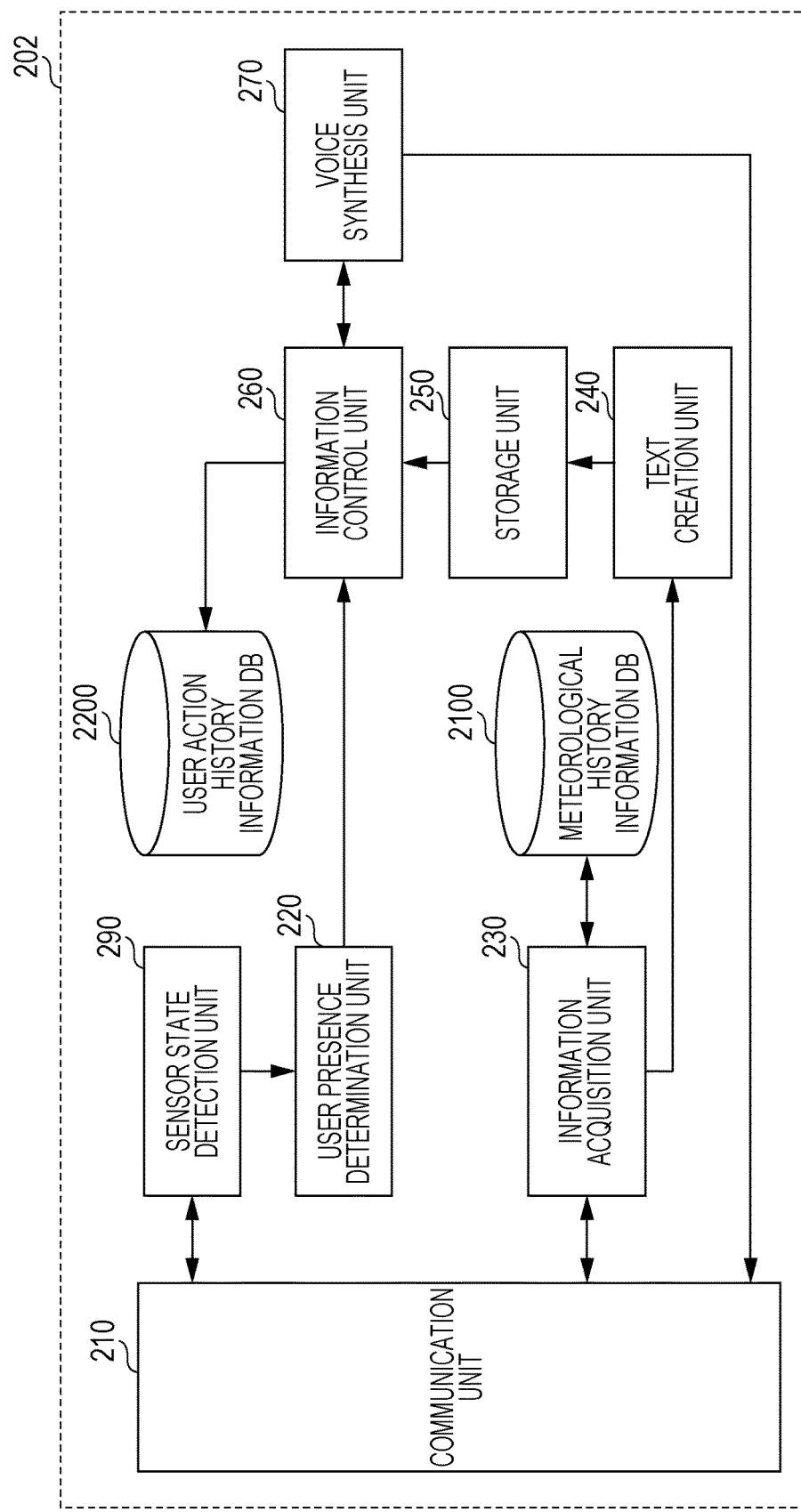
FIG. 8 is a block diagram illustrating an internal configuration of an information notification apparatus in second to fourth examples of the second embodiment.

FIG. 8 illustrates an internal configuration of the information notification apparatus 202 used to implement the second example of this embodiment. FIG. 8 is a block diagram illustrating an internal configuration of an information notification apparatus in second to fourth examples of the second embodiment. When compared with the configuration of the information notification apparatus 201 illustrated in FIG. 3, the information notification apparatus 202 newly includes a meteorological history information DB 2100 and a user action history information DB 2200. Each database (DB) stores meteorological history information which is history of meteorological information acquired from the external server 800 and user action history information which is history of information indicating whether or not a user is present who has been detected by a human detection sensor 100. Since the user action history information DB 2200 is needed in a third example or later of the second embodiment, a description thereof is omitted here.

Here, an initial configuration file of the priority order illustrated in FIG. 9 and a notification condition table illustrated in FIG. 10 and FIG. 11 are stored in an information acquisition unit 230. A method of setting the priority order in the second example with reference to these diagrams is described.

First, FIG. 9 illustrates a configuration file of a priority order set for each meteorological information that is set in an initial state in advance by an information provider. In FIG. 9, disaster prevention information such as "heavy rain", "flood", "tsunami" has the highest priority order of notification, followed by weather information such as "clear", "rainy", "cloudy" as second highest priority order, and subsequent priority order is set in the descending order in the direction indicated by a symbol ">".

Then, FIG. 10 illustrates a condition table related to notification of disaster prevention information, which is a type of meteorological information. FIG. 10 illustrates the condition table including a number assigned to manage a condition, a condition related to content of disaster prevention information, second meteorological information to be associated with disaster prevention information and notified, and content of a change in a priority order of the second meteorological information.

Then, FIG. 11 illustrates a condition table related to notification of meteorological information not included in FIG. 10. In FIG. 11 are included a number assigned to manage a condition, a condition related to content of meteorological information, meteorological information which is a change target of a priority order when a condition is met, and content of a change in the priority order of meteorological information satisfying the condition.

In FIG. 8, the information acquisition unit 230 acquires the latest meteorological information from the external server 800, and sets a value of a priority order to each of the meteorological information acquired by referring to the configuration file of the priority order illustrated in FIG. 9. Then, if disaster prevention information of the information acquired from the external server 800 is publicized, the information acquisition unit 230 refers to the condition table illustrated in FIG. 10, and searches for the condition that is related to content of the disaster prevention information. If content of the disaster prevention information satisfies any of the conditions, a priority order of second meteorological information to be associated with the disaster prevention information and notified is updated.

The information acquisition unit 230 further refers to history of meteorological information stored in the meteorological history information DB 2100 and the condition table illustrated in FIG. 11 as well as the condition in FIG. 10, and searches for the condition related to content of other meteorological information. If content of meteorological information satisfies any of the conditions, a priority order of meteorological information that satisfies the condition is updated.

The example described above is specifically described with reference to FIG. 12. In FIG. 12 are included, for example, a list of meteorological information acquired from the external server 800, two-day meteorological history information stored in the information acquisition unit 230, and setting of each priority order. As illustrated in FIG. 9, a priority order in an initial state is set in the descending order as "disaster prevention information, weather, precipitation probability, maximum temperature, minimum temperature, ultraviolet rays". In meteorological information on July 27, since content of "disaster prevention information" and "precipitation probability" satisfy the conditions of C001 and C005 illustrated in FIG. 11, the disaster prevention information and the precipitation probability are not notified on that day. As a result, meteorological information with next lower priorities can be sequentially shifted up to higher ranks. In addition, in meteorological information on July 28, since the disaster prevention information of "high temperature" is publicized and satisfies the condition of E005 in FIG. 10, the priority order of "maximum temperature" is shifted up to a higher rank so that it is notified after the "disaster prevention information". Furthermore, since "weather" information of July 28 is "clear" for two consecutive days following July 27, it satisfies the condition of C002 in FIG. 11 and no "weather" information is notified on that day.

In this manner, according to the second example described above, effective information notification can be implemented by changing information that is to be preferentially notified to deal with a case in which important information is updated on a daily basis, depending on the meteorological condition.

In the second example described above is described the example in which the initial configuration file of the priority order illustrated in FIG. 9 is set by the information provider. However, it may be set by the user.

Third Example

In a third example is described an example in which a human detection sensor 100 is used to learn user's reaction to information notification depending on whether or not a user stays around a home appliance 500 while information is being notified, and a priority order of meteorological information to be notified is judged based on the learned information.

First, as illustrated in FIG. 8 of the second example described above, the information notification apparatus 202 here newly includes a user action history information DB 2200. In addition, the user action history information DB 2200 detects whether a user has left a detection range of the human detection sensor 100 while the information notification apparatus 202 is performing notification of meteorological information. If it is determined that the user has left, the user action history information DB 2200 associates the meteorological information being notified with current time and stores it. Within the information notification apparatus 202, when presence of the user is detected, the information control unit 260 searches meteorological history information stored in the user action history information DB 2200 for meteorological information that matches meteorological information extracted from the storage unit 250, and judges whether or not the user stays in the detection range of the human detection sensor 100 till notification is complete, when meteorological history information was notified at the same time in the past.

If it is found that the user did not stay in the detection range of the human detection sensor 100 when meteorological information scheduled to be notified was notified in the same time zone in the past, the information control unit 260 erases the information scheduled to be notified and extracts meteorological information scheduled to be notified next from the storage unit 250. Here, the information control unit 260 repeatedly performs the procedure described above till the meteorological information for which the user stayed in the detection range of the human detection sensor 100 in that time zone is found.

In this manner, according to the third example described above, by learning whether or not a user stays nearby while information is being notified, it becomes possible to identify information necessary for the user in that time zone.

Fourth Example

A fourth example describes an example in which user's preferences are predicted by using a learning method and a priority order of meteorological information to be notified when detecting a user is judged accordingly.

First, similar to the third example described above, the information notification apparatus 202 includes the user action history information DB 2200. The home appliance 500 has a notification stop button dedicated for the information notification apparatus 202, separately from the operation unit 300. Here, for example, if the notification stop button is pressed while information is being notified, the information notification apparatus 202 associates meteorological information being notified with current time, accumulates it in the user action history information DB 2200, and stops notification. In addition, within the information notification apparatus 202, when presence of a user is detected, the information control unit 260 judges based on history information accumulated in user preference history information 2100 whether or not meteorological information extracted from the storage unit 250 was stopped by the user in the past. If meteorological information scheduled to be notified has been stopped by the user when it was notified in the same time zone, the information control unit 260 erases the meteorological information scheduled to be notified and extracts meteorological information scheduled to be notified next from the storage unit 250. Here, the information control unit 260 repeatedly performs the procedure described above till meteorological information the notification of which was not stopped by the user in the past is found.

In this manner, according to the fourth example described above, by learning whether or not the notification stop button is pressed while information is being notified, it becomes possible to identify information necessary for a user in that time zone.

Fifth Example

Next, described in a fifth example is a method of setting a priority order if an apparatus capable of detecting an environmental condition such as indoor "temperature" or "humidity" in a house where the home appliance 500 is installed is present and can communicate with the information notification apparatus 200. FIG. 13 illustrates a condition table related to the indoor environmental condition. In FIG. 13 are included a number assigned to manage a condition, a condition related to the indoor environmental condition, meteorological information that becomes a target of change in a priority order when a condition is satisfied, and content of the change in the priority order of meteorological information that satisfies the condition.

For example, the information notification apparatus 200 regularly monitors the indoor environmental condition. Suppose that the indoor temperature suddenly exceeds 30° C. in a certain time zone although no disaster prevention information is publicized on that day. Accordingly, within the information notification apparatus 200, the information control unit 260 accesses the storage unit 250 and shifts up the priority order of "maximum temperature" to the top rank. With this, when the information notification apparatus 200 detects presence of a user, it notifies the user of "maximum temperature".

In this manner, according to the fifth example described above, by determining meteorological information necessary for a user depending on not only outdoor meteorological information but also the indoor environmental condition, more effective information notification can be performed.

Sixth Example

Next, described in a sixth example is an example of a notification method in a case in which the information notification system 200 can acquire history information of a web screen or application that a user browses on the information terminal 900 via the network 700. Here, it is assumed that the information notification apparatus 200 stores in advance information contained in a website or an application related to meteorological information. For example, if the user browses a website of predetermined meteorological information on the information terminal 900, the information notification apparatus 200 notifies the user of information that is not found in the above-mentioned website, without performing notification of meteorological information that the user has already checked on the above-mentioned website.

In this manner, according to the sixth example described above, by performing notification of information after determining whether or not a user has already known meteorological information to be notified from now, the information notification apparatus 200 can reduce excessive information notification to the user.

In the example described above, the information notification apparatus 200 performed notification of information in cooperation with the information terminal 900 in order to determine meteorological information that the user has already checked on other terminal. However, for example, if the information notification apparatus 200 stores in advance broadcasting time of a weather program on a television or a radio and content of meteorological information to be broadcasted, it is also possible that meteorological information checked by the user can be determined depending on whether or not the television or the radio is started at that broadcasting time.

The second embodiment has been described above.

In this embodiment, in addition to the above, a method of setting a priority order of meteorological information may also be set according to the descending or ascending order of time duration of announcement included in the table in FIG. 7. Alternatively, the priority order of notification may be set in a combination of two or more of the first to fourth examples described above.

Third Embodiment

A third embodiment is described hereinafter in detail with reference to a flowchart of FIG. 14. In the first and second embodiments described above, the method of adaptively controlling the amount of information and the priority order in notification of meteorological information is described. Although failure of notification of necessary meteorological information can be prevented by these methods, no consideration is given to notification of all meteorological information scheduled to be notified. Thus, described in this embodiment is a method of enabling notification to a user of all meteorological information managed by an information acquisition unit 230.

First, a first example addresses the following situation.

An electronic lock with a communication function is mounted on an entrance door of a house where a home appliance 500 is installed. When the electronic lock is locked from outside of the door, it detects that a user goes out. Then, when detecting absence of the user, the electronic lock informs an information notification apparatus 200 accordingly via a home gateway 600. In addition, after being informed that the user is out, the information notification apparatus 200 notifies an information terminal 900 carried by the user of information in the form of text data.

Figures 14, 15:
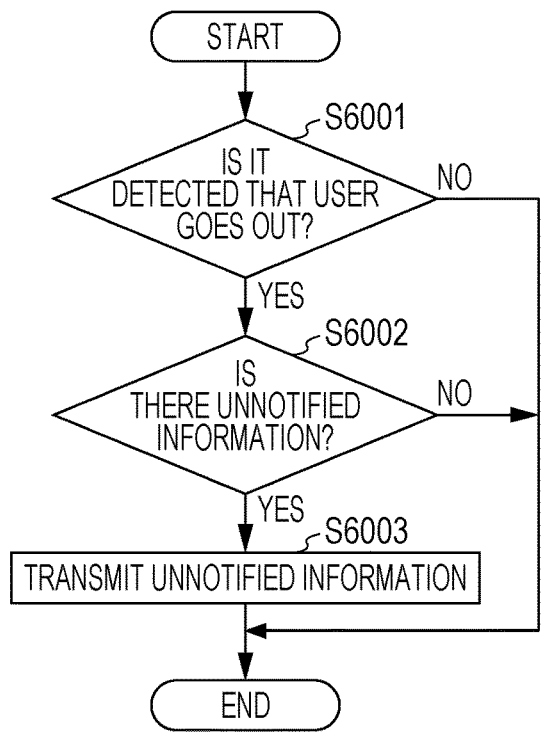
FIG. 14 is a flowchart illustrating a procedure of an information notification apparatus in a third embodiment.
FIG. 15 illustrates a schedule of a user in a fourth embodiment.

Specifically, in FIG. 14, in step S6001, when the electronic lock detects absence of the user, the home gateway 600 causes an interrupt to the information notification apparatus 200. Within the information notification apparatus 200, a user presence determination unit 220 identifies the received interrupt, and transmits to an information control unit 260 a request for notification to the information terminal 900. In step S6002, the information control unit 260 judges whether or not there is unnotified meteorological information in a storage unit 250 at present. If there is unnotified meteorological information in step S6002, the information control unit 260 extracts information from the storage unit 250 in step S6003 and transmits it to the information terminal 900 via a communication unit 210. This enables the user to check unnotified meteorological information on the information terminal 900.

In this manner, according to the above example, even when there are a large number of information pieces scheduled to be notified, it becomes possible to perform notification of all information pieces, and thus to prevent information that should be notified from being left unnotified to a user.

The third embodiment has been described above.

In this embodiment, the example of detecting that the user goes out with the electronic lock of the entrance door is described. However, for example, if the information terminal 900 carried by the user has a GPS function capable of detecting positional information and the information notification apparatus 200 can acquire the user's positional information from an external server 800, the electronic lock can be utilized in place of the information terminal 900. In addition, if a home appliance having a communication function such as room lights is present in the house, for example, the information notification apparatus 200 acquires a state of the lighting via the home gateway 600 and can determine that a user is out if the acquired state of the lighting is off.

Fourth Embodiment

A fourth embodiment is described hereinafter in detail with reference to the drawings. Described in the first to third embodiments is the method of adaptively controlling the amount of information and the priority order in the notification of meteorological information related to a region where a user lives However, no consideration is given to notification of meteorological information of a different region that the user wishes. For example, it is possible that since the user plans to go on a business trip on that day, the user wishes to be notified of meteorological information at a destination of the business trip, which is different from the region of his/her resident location.

Then, described in this embodiment is a method of detecting meteorological information in a case in which the information notification apparatus 200 works with schedule management software used by a user to manage work or private schedule via a network 700. Here the user uses an information terminal 900 to register in the information notification apparatus 200 information such as an address of the schedule software that the user is currently using, the schedule including at least a date and a location.

Specific examples of this embodiment are described hereinafter in detail with reference to FIG. 15 and FIG. 16.

FIG. 15 illustrates an example of information extracted from a user's schedule. In FIG. 15 are included a date, content of an event, and a location.

Figure 16:
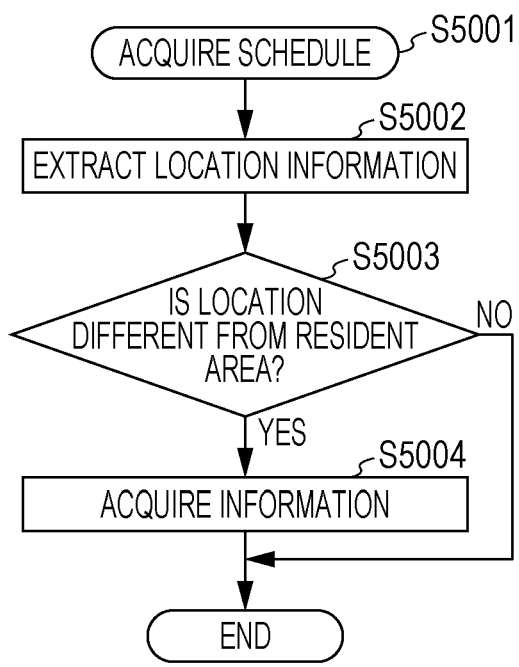
FIG. 16 is a flowchart illustrating a procedure of an information notification apparatus in the fourth embodiment.

FIG. 16 illustrates a procedure of a method of acquiring meteorological information to be notified depending on information extracted from the user's schedule.

In FIG. 16, in step S5001, an information acquisition unit 230 acquires user's schedules on that day via a communication unit 210. Then, in step S5002, the information acquisition unit 230 extracts information on a location associated with each of the acquired schedules and compares it with information on a user's resident location stored in advance in step S5003. In step S5003, if it is judged that the location is different from the user's resident location, the information acquisition unit 230 acquires meteorological information of the region from an external server 800 in step S5005 and transmits it to an information control unit 260. Here, it is assumed that the priority order of meteorological information of different regions can be set with the method described in the second embodiment.

In this manner, according to the above example, notification of meteorological information on different regions in a user's unusual event becomes possible.

The fourth embodiment has been described above.

In this embodiment, the example of schedule that the user utilizes to manage his/her work or private schedule is described. However, for example, it may be a home appliance operation schedule that the user utilizes to manage operation of a home appliance present in his/her house. Specifically, for example, there is an example in which if the user enters an operation schedule of a washing machine on that day, an information notification apparatus 201 preferentially notifies the user of meteorological information such as "precipitation probability".

Fifth Embodiment

A fifth embodiment is described hereinafter in detail with reference to FIG. 17. In the first to fourth embodiments described above, the method of controlling the content, the amount of information, and the priority order of meteorological information to be notified to the user is described. However, no consideration is given to whether the user is in a situation in which he/she can listen to information when the information is notified. For example, when a user is detected and if the information notification apparatus 200 notifies the user of information although the user is on a mobile phone, the user is not in a situation in which he/she can listen to the information. Thus, it can be stated that information notification is not effective. In addition, in the situation described above, since the information notification apparatus 200 prevents user's action, it provides the user with uncomfortable feeling.

Figure 17:
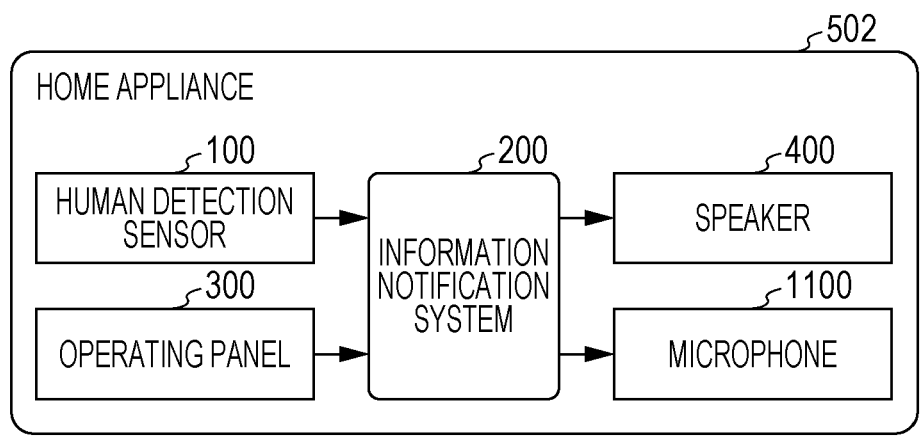
FIG. 17 is a block diagram illustrating an internal configuration of an information notification apparatus in a fifth embodiment.

Thus, in this embodiment, in FIG. 17, a home appliance 502 has a microphone 1100, and the information notification apparatus 200 attempts to interrupt notification of information if it recognizes user's voice within a predetermined range from the home appliance 502 immediately before or while information is notified. Here, the interrupted information is played from the beginning of a sentence next time the user is detected.

The fifth embodiment has been described above.

The information notification method described in the embodiment of the disclosure is described with the home appliance 500 provided with the speaker 400 as an example. Thus, content of information notification performed by determining whether or not a user is present around the home appliance 500 is described. However, if the speaker 400 is installed independently of the home appliance 500, information notification may be performed by determining whether or not a user is present around the speaker 400.

The information notification method described in the embodiment of the disclosure is described with the example of performing notification of weather information or meteorological information as notice information. However, the notice information is not limited to content thereof, and any type of information such as sports, politics, entertainment or the like may be notified. In addition, a user may optionally set a type of notice information.

It is a matter of course that the information notification method described in the embodiment of the disclosure can serve multiple users by applying the information notification method described above, for example, when a camera capable of identifying a user is used.

Sixth Embodiment

A sixth embodiment is described with reference to FIG. 18. In this embodiment, operation of an information notification apparatus 200 is described, wherein while first notice information to be notified by voice is notified from the information notification apparatus 200, user detecting means such as a human detection sensor 100, for example, can no longer detect presence of a user around the information notification apparatus.

Figure 18:
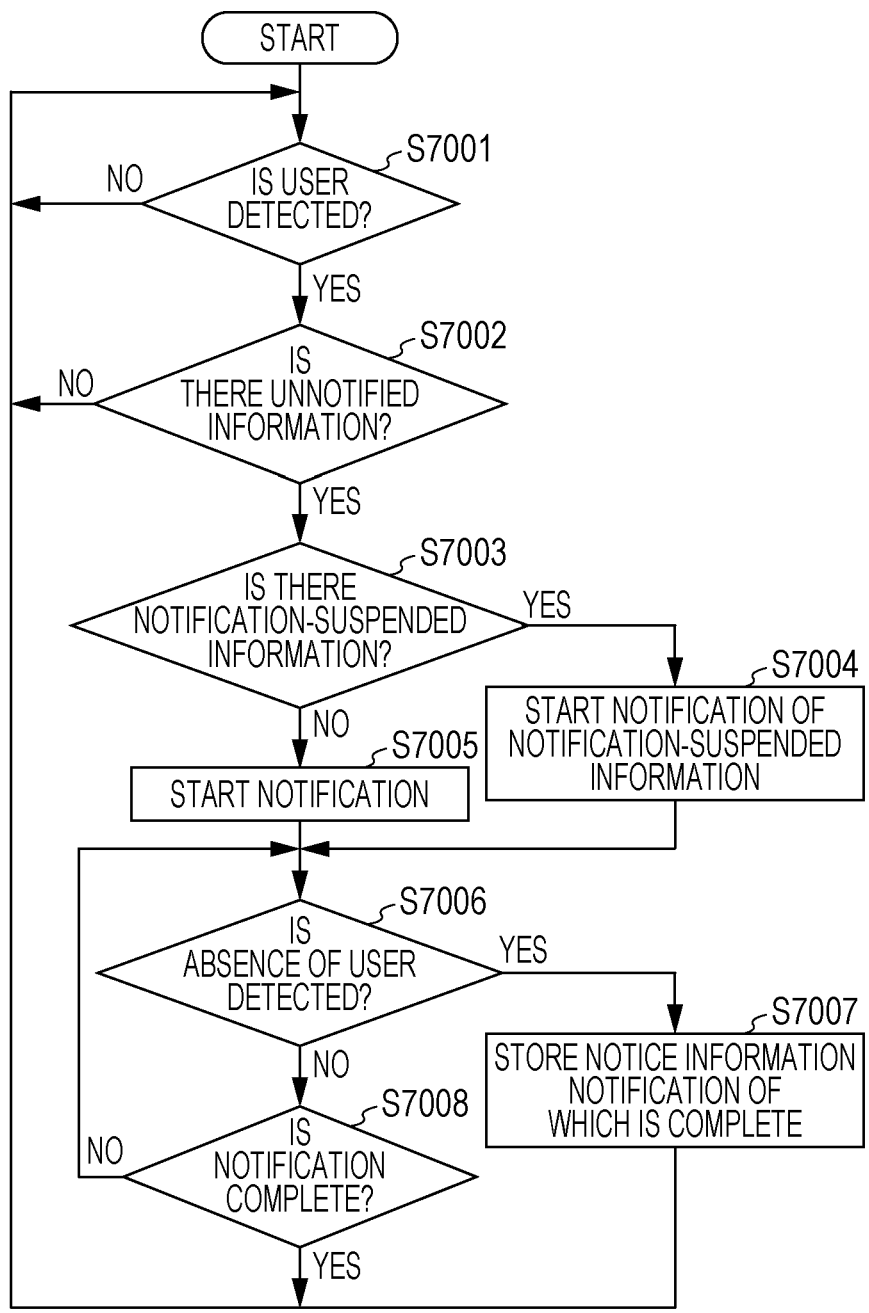
FIG. 18 is a flowchart illustrating a procedure of an information notification apparatus in a sixth embodiment.

FIG. 18 is a flowchart illustrating a procedure of the information notification apparatus in the sixth embodiment. Here, it is described that similar to the embodiments described above, the information notification apparatus 200 acquires in advance multiple pieces of notice information to be notified to a user from an external server 800 or the like via a network 700, stores it in a storage unit 250 of the information notification apparatus 200, reads out notice information stored in the storage unit 250, and notifies the user the notice information. However, an acquisition form of additional information is not limited to the above, and every time there arises a need to newly notify information, information may be acquired from the external server 800 via the network 700 and the acquired information may be notified.

In FIG. 18, in step S7001, if it is determined by using the methods in the first to third examples described above that the user is present around the home appliance 500, a user presence determination unit 220 is requested to perform notification of meteorological information. Accordingly, in step S7002, an information control unit 260 judges whether or not there is unnotified meteorological information in information stored in the storage unit 250. If it is determined that there is unnotified information, the information control unit 260 further determines whether or not there is notification-suspended information in the information stored in the storage unit 250. A process when it is determined that there is notification-suspended information in step S7003 is described below.

If it is determined in step S7003 that there is no notification-suspended information, notification of first meteorological information starts. Then, while the first meteorological information is notified, it is determined in step S7006 whether the user is no longer present around the home appliance 500. In step S7006, if it is detected that the user is present around the home appliance 500 while the first meteorological information is notified, it is determined in step S7008 whether or not notification of the first meteorological information is complete. If it is determined that the notification of the first meteorological information is not complete, the process returns to step S7006 where the determination of whether or not the user is no longer present around the home appliance 500 is repeated. If the notification of the first notice information is complete, the process returns to step S7001 where presence of the user is detected again. Here, if it is determined in step S7001 that the user is present around the home appliance 500, it is determined in step S7002 that there is unnotified information, and it is determined in step S7003 that there is no notification-suspended information, the information control unit 260 starts to perform notification of second meteorological information. On the other hand, if the user is not present around the home appliance 500 when notification of the first notice information is complete, if it is determined that there is no unnotified information, or if it is determined that there is notification-suspended information, the information control unit 260 does not notify the second information.

Here, in step S7006, a case in which it is detected that the user is no longer present around the home appliance 500 while the first meteorological information is notified is described. Then, the information control unit 260 stores the first meteorological information as notification-suspended information in the storage unit 250. Then, for example, if the first meteorological information is outputted in voice in a speaker 400, the information control unit 260 stores in the storage unit 250 outputted information indicating which part of text of the first meteorological information is outputted in voice before it is detected that the user is no longer present around the home appliance 500, together with the notification-suspended information mentioned above.

Then, in step S7001, if it is detected again that the user is present around the home appliance 500, it is determined in step S7002 whether or not there is unnotified information in the information stored in the storage unit 250. Then, if there is notification-suspended information in the storage unit 250, the notification-suspended information is treated as a type of unnotified information, and it is determined that there is unnotified information.

Then, in step S7003, since it is determined that there is notification-suspended information in the information stored in the storage unit 250, the process proceeds to step S7004. In step S7004, notification of notification-suspended information starts. Then, based on the outputted information described above, notification of the notification-suspended information starts. More specifically, notification of the first meteorological information is resumed from a half-way position. Here, the notification may resume from a position in the first meteorological information indicated by the outputted information or from a predetermined period before or after the position.

When notification of notification-suspended information starts, the process proceeds to step S7006. Then, the similar flow is repeated as described above.

As described above, in the sixth embodiment, the information notification apparatus 200 resumes notification of the first meteorological information if the user once leaves the location around the home appliance 500 and then returns to the location around the home appliance 500 while the first meteorological information is being notified. This can prevent the user from missing information notified by the information notification apparatus 200.

In addition, as a variation of the sixth embodiment, in step S7004 described above, notification of the information following the notification-suspended information (first meteorological information), more specifically, the second meteorological information may start without performing notification of the notification-suspended information. Then, even when the user leaves the location around the home appliance 500 while the first meteorological information is being notified, the first meteorological information is treated as already being notified. If it is determined that the user is present again around the home appliance 500, the information notification apparatus 200 starts to perform notification of the second meteorological information, which is next notice information, rather than resuming notification of the first meteorological information.

This can prevent, for example, information that is to be notified by the information notification apparatus 200 and that a user has already listened to halfway from being notified to the user again.

The embodiments of the disclosure have been described above in detail with reference to the drawings. However, a specific configuration is not limited to the embodiments and a design that does not go beyond the gist of the disclosure or the like is also included.

The information notification method according to the present disclosure is useful in an information notification system or an information notification apparatus that is connected to a speaker and notifies a user of voice information.

What is claimed is:

1. A computer implemented method comprising:
   receiving a plurality of pieces of notice information by using a processor;
   receiving detection information indicating whether or not a user is present around a speaker by using the processor, the speaker being installed inside a house;
   notifying the user of content of first notice information, in the plurality of pieces of notice information, by using the speaker and the processor, when it is determined, based on the detection information, that the user is present around the speaker;
   notifying the user of content of second notice information, that is different from the first notice information, by using the speaker and the processor, when it is determined that the user is present around the speaker when the notification of the first notice information by using the speaker is complete,
   receiving speech information representing speech of the user from a microphone;
   during receiving of speech information from the microphone, suspending the notification of the notice information while speech information is being received, the speech information being independent from the receiving of the plurality of pieces of the notice information;
   determining whether or not there is unnotified information, which is notice information that is not notified to the user among the plurality of pieces of notice information, when it is determined that the user is not present around the speaker after the first notice information is notified to the user;
   receiving absence detection information from an absence detector, the absence detection information indicating that the user has left the house where the speaker is installed; and
   notifying the user of the unnotified information via an information terminal that the user carries into and out of the house, when it is determined that the unnotified information is present and the absence detection information, indicating that the user has left the house, is received.

2. The computer implemented method according to claim 1,
   wherein, in the receiving, detection information is received from a human detection sensor that detects whether or not the user is present.

3. The computer implemented method according to claim 2,
   wherein in the notifying the user of content of the first notice information and in the notifying the user of content of the second notice information, it is determined that the user is present around the speaker while the human detection sensor is detecting presence of the user.

4. The computer implemented method according to claim 2,
   wherein, in the notifying the user of content of the first notice information and in the notifying the user of content of the second notice information, when a state of the human detection sensor changes from a state in which presence of the user is detected to a state in which presence of the user is not detected, it is determined, within a predetermined period of time after the state of the human detection sensor changes, that the user is present around the speaker.

5. The computer implemented method according to claim 1,
   wherein, in the receiving, detection information is received from an open/close sensor that detects an open/close state of a door of a refrigerator which is provided with the speaker, the detection information indicating the open/close state of the door detected by the open/close sensor.

6. The computer implemented method according to claim 5,
   wherein, in the notifying the user of content of the first notice information and in the notifying the user of content of the second notice information, it is determined, while the open/close sensor is an open state, that the user is present around the speaker.

7. The computer implemented method according to claim 5,
   wherein in the notifying the user of content of the first notice information and in the notifying the user of content of the second notice information, when the open/close sensor detects that the open/close state changes from the open state to a closed state, it is determined, within a predetermined period of time after a time when the open/close state changes, that the user is present around the speaker.

8. The computer implemented method according to claim 1,
   wherein the first notice information and the second notice information include text information, and
   using voice synthesization based on the text information, content indicated by the first notice information and the second notice information is notified to the user.

9. The computer implemented method according to claim 1,
   wherein the plurality of pieces of notice information is voice information, and
   the first notice information and the second notice information are notified to the user by playing the voice information.

10. The computer implemented method according to claim 1,
    wherein each of the plurality of pieces of notice information is assigned a priority, and
    the first notice information is selected from the plurality of pieces of notice information based on the priority.

11. The computer implemented method according to claim 10,
    wherein the priorities of types of the notice information are set by a user.

12. The computer implemented method according to claim 10,
    wherein the priorities of types of the notice information are set in advance, and
    the priorities of the types of the notice information are changed, based on weather information or meteorological information at a time on a day when the notice information is to be notified when content indicated by the weather information or content indicated by the meteorological information matches a predetermined condition.

13. The computer implemented method according to claim 10,
 wherein the first notice information is notice information having the highest priority, of the plurality of pieces of notice information.

14. The computer implemented method according to claim 13,
 wherein the second notice information is notice information having the second highest priority relative to the first notice information, of the plurality of pieces of notice information.

15. The computer implemented method according to claim 1,
 wherein when there are a plurality of pieces of unnotified information, at least one of the plurality of pieces of unnotified information is notified to the user via the information terminal.

16. The computer implemented method according to claim 1, further comprising:
 receiving daily destination information indicating a destination to be visited by the user; and
 receiving, as the plurality of pieces of notice information based on the destination information, weather information or meteorological information at the destination to be visited by the user on a date when the notice information is to be notified.

17. The computer implemented method according to claim 1, further comprising:
 receiving speech information representing speech of the user from a microphone; and
 keeping the user from being notified of content indicated by the second notice information when it is determined, based on the received speech information, that the user is present and speaking around the speaker, when notification of the first notice information is complete.

18. An apparatus comprising:
 a processor;
 a speaker installed in a structure; and
 a memory having stored thereon a program, the program causing the processor to execute operations including:
  receiving one or more pieces of notice information to be notified to a user;
  acquiring detection information indicating whether or not the user is present around the speaker;
  notifying the user of first notice information, of the one or more pieces of notice information, when it is determined based, on the detection information, that the user is present around the speaker;
  notifying the user of second notice information, which is different from the first notice information, when it is determined when the notification of the first notice information is complete and that the user is present around the speaker;
  receiving speech information representing speech of the user from a microphone; and
  during notification of any notice information of the plurality of pieces of notice information, suspending the notification of the notice information upon being notified that the speech information is received, the speech information being distinct from the notification of the notice information and the microphone being distinct from the speaker
  determining whether or not there is unnotified information, which is notice information that is not notified to the user among the plurality of pieces of notice information, when it is determined that the user is not present around the speaker after the first notice information is notified to the user;
  receiving absence detection information from an absence detector, the absence detection information indicating that the user has left the structure where the speaker is installed; and
  notifying the user of the unnotified information via an information terminal that the user carries into and out of the structure, when it is determined that the unnotified information is present and the absence detection information, indicating that the user has left the house, is received.

* * * * *